INVENTORS
WILBUR MAGRUDER HURST
LEONARD M. KLEIN
BY
ATTORNEYS

INVENTORS
WILBUR MAGRUDER HURST
LEONARD M. KLEIN
BY
ATTORNEYS

July 28, 1942.  W. M. HURST ET AL  2,291,093
MACHINE FOR HARVESTING FLAX AND SIMILAR PLANTS
Filed Nov. 17, 1941  4 Sheets-Sheet 3

INVENTORS
WILBUR MAGRUDER HURST
LEONARD M. KLEIN
BY
ATTORNEYS

July 28, 1942.  W. M. HURST ET AL  2,291,093
MACHINE FOR HARVESTING FLAX AND SIMILAR PLANTS
Filed Nov. 17, 1941  4 Sheets—Sheet 4
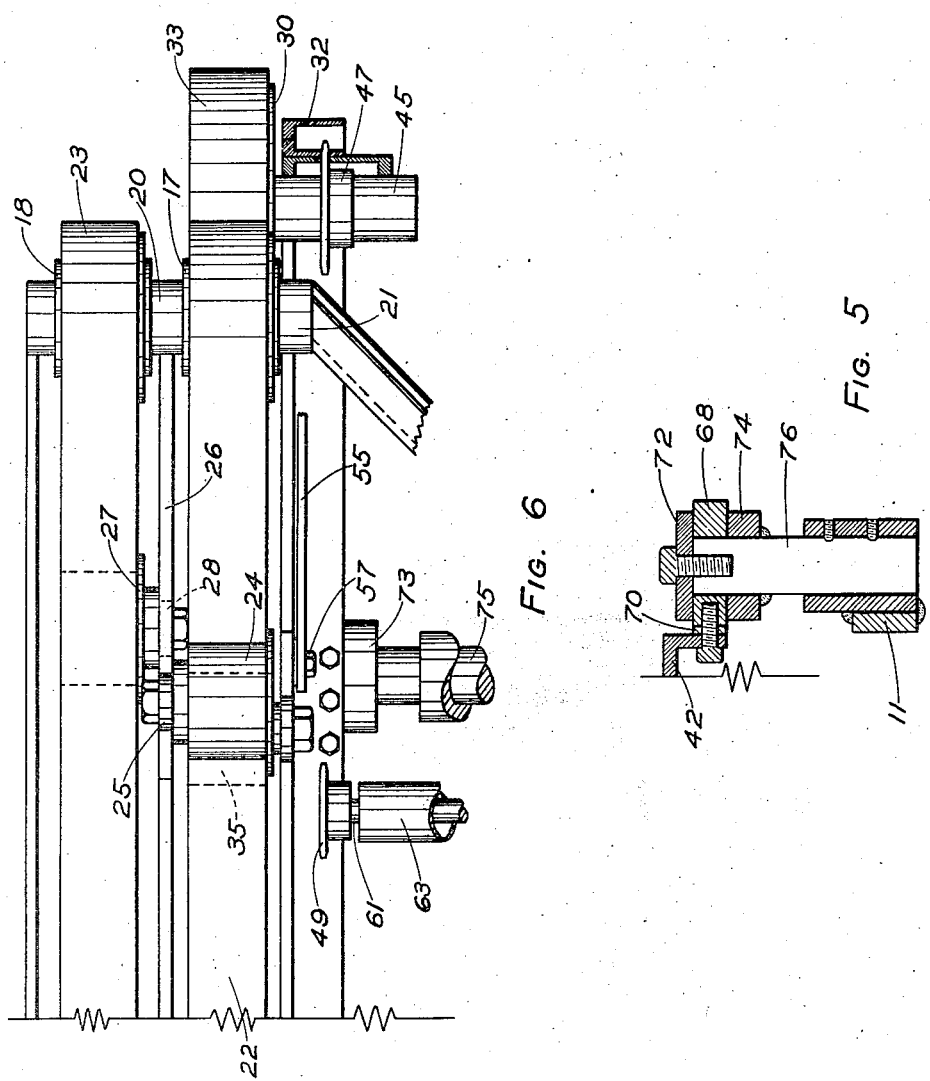
INVENTORS
WILBUR MAGRUDER HURST
LEONARD M. KLEIN
By
ATTORNEYS Patented July 28, 1942

2,291,093

UNITED STATES PATENT OFFICE 2,291,093

MACHINE FOR HARVESTING FLAX AND SIMILAR PLANTS

Wilbur Magruder Hurst and Leonard M. Klein, Corvallis, Oreg., dedicated to the free use of the People in the territory of the United States Application November 17, 1941, Serial No. 419,466

5 Claims. (Cl. 55—66)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the people in the territory of the United States to take effect on the granting of a patent to us.

This invention relates to the harvesting of flax and plants of a similar nature and is more particularly concerned with a machine which can be used for this purpose.

Fiber in flax is produced throughout the entire length of the stalk. If the stalks are severed above the surface of the ground, the fiber in the stubble is lost, thereby reducing the fiber yield. For this reason, it is desirable to uproot or pull the plant out of the ground rather than to cut it as is customary with wheat and other small grain plants.

It is a common observation that devices which bind flax straw while the straw is in a substantially horizontal position produce bundles with uneven butt ends which are objectionable in subsequent processing operations. A butter of the type used on grain binders does not work well on the root ends of the straw. The vibration of the machine over the ground has a tendency to even straw vertically disposed, but is ineffective on straw horizontally disposed. For this reason the vertical type of binder is preferred. However, binders have narrow throats into which the stalks are fed in a sheet and mechanical difficulties are involved in delivering the flax straw to the mouths of such binders in a vertical position from a flax pulling machine. Since the width of the swath which can be pulled by each pulling unit is limited, several units laterally disposed must be employed for adequate capacity, giving in prior devices overall widths at the delivery ends of the pulling units that are too large for the throat of a vertical binder when pulleys of adequate size are used for the belts. Consequently, either the horizontal type of binder must be used with the prior devices or additional devices must be employed between the delivery end of the puller and the throat of the binder. Devices of this kind increase the number of working parts and complicate design and construction problems.

In view of the above, one of the objects of this invention is the provision of a machine which will uproot flax and other similar plants when operated through a standing crop thereof and which is an improvement over other known machines adapted to accomplish a similar purpose.

Another object of this invention is the provision of a flax-pulling harvester having more than one pulling unit and in which the delivery end is sufficiently narrow to permit its operation in the mouth of a vertical binder.

Other objects and advantages of this invention will be apparent from the following description considered together with the accompanying drawings illustrating an embodiment of this invention, in which drawings:

Figure 5 is a section along the line 5—5 of Figure 2; and

Figure 6 is a view from the line 6—6 of Figure 2.

Figure 1:
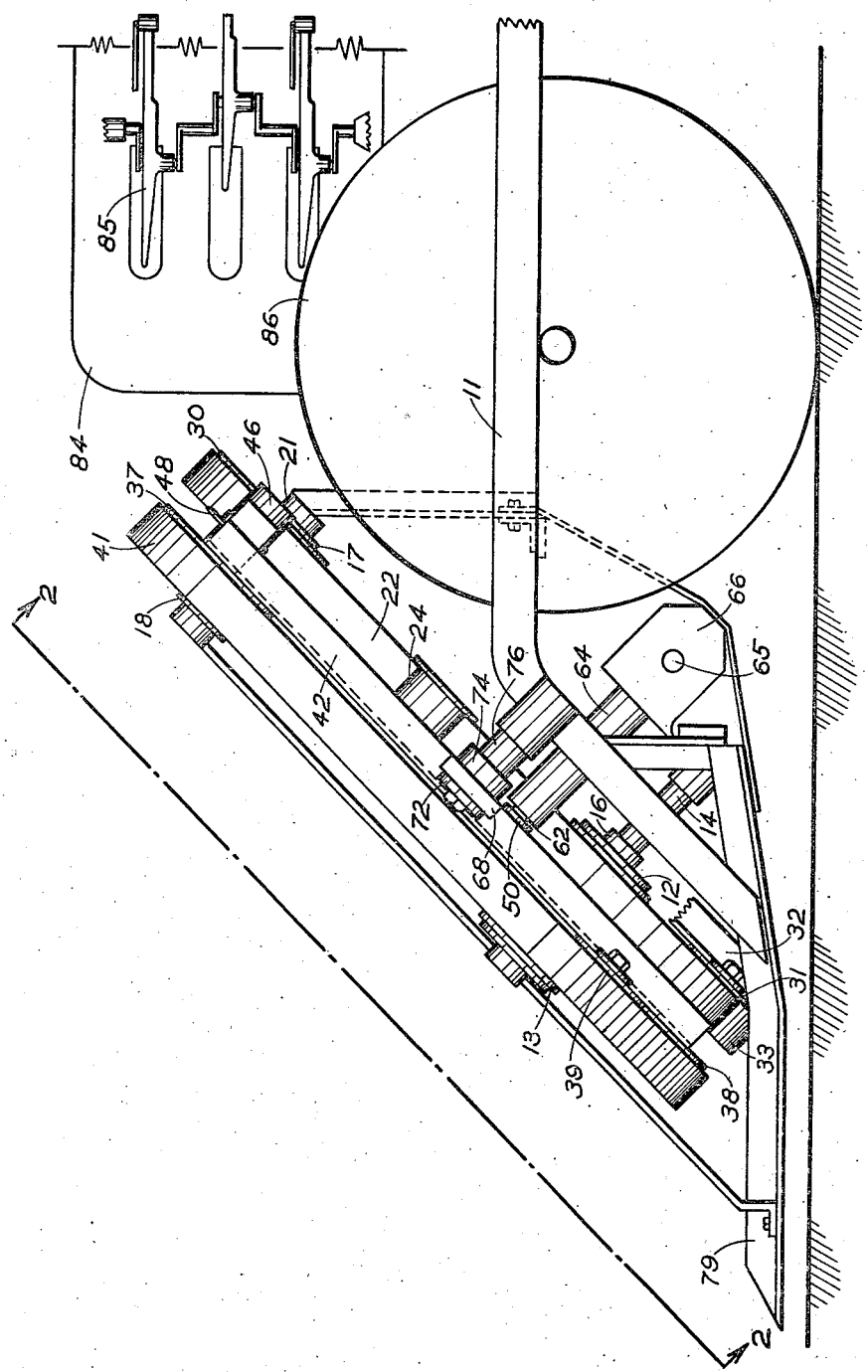
Figure 1 is a side elevational view.
Figure 2:
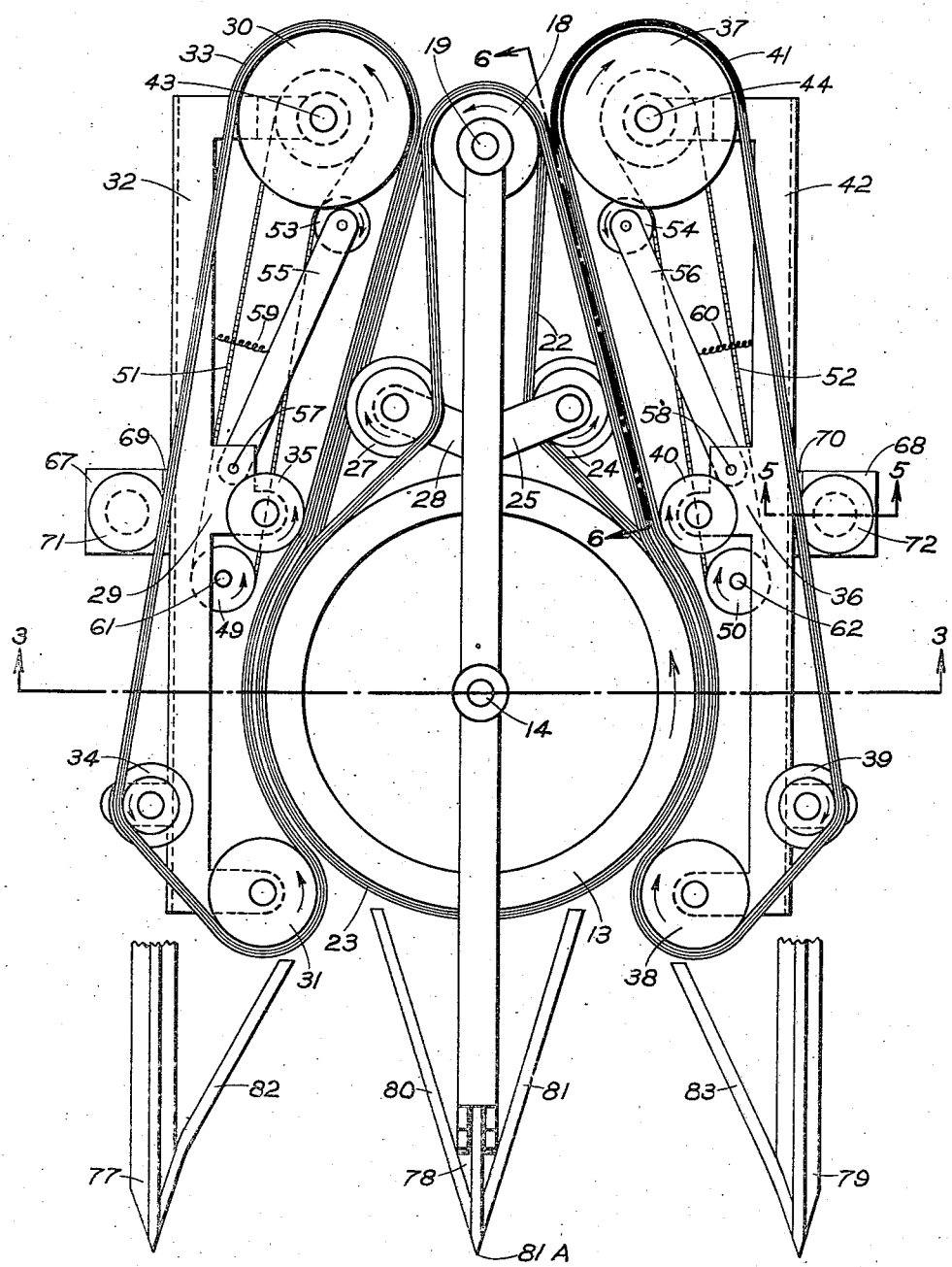
Figure 2 is a plan view from the line 2—2 of Figure 1 to bring the device in a plane parallel to the picture plane.
Figure 3:
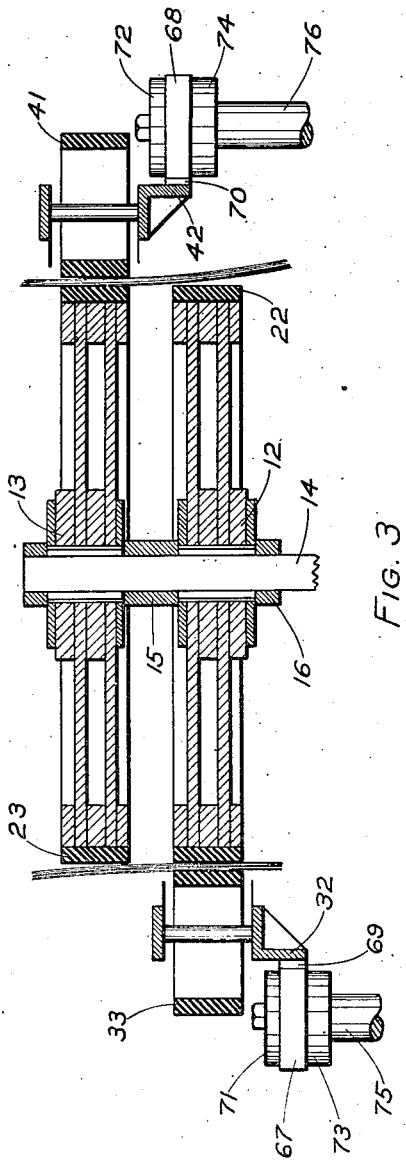
Figure 3 is a section along the line 3—3 of Figure 2.
Figure 4:
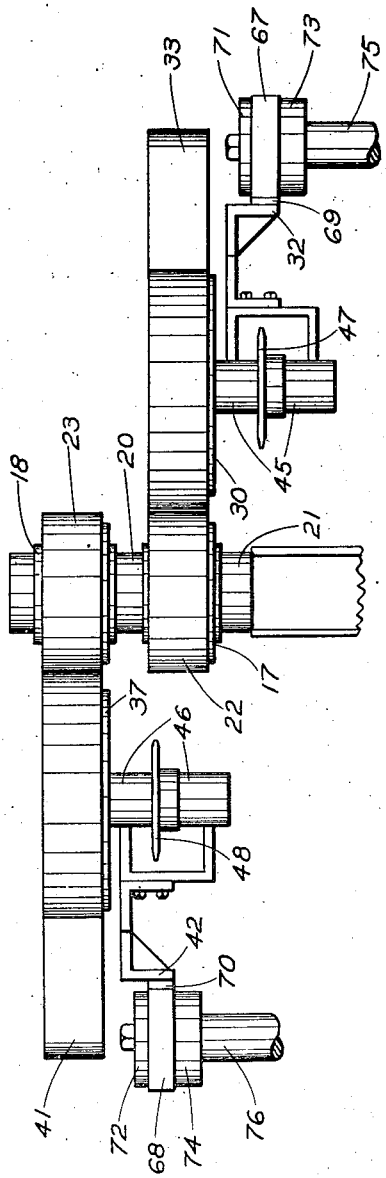
Figure 4 is a top end view perpendicular to the picture plane of Figure 2.

Referring with more particularity to the drawings, in which like numerals designate like parts, the machine is carried on a suitable fixed frame structure 11, upon which is mounted a pair of concentric wheels 12 and 13 in inclined parallel planes, the inclination being toward the rear. The wheels 12 and 13 are carried for independent rotation on an axle 14 and are held in spaced relation thereon by means of a spacing collar 15. The lower wheel 12 rests upon a thrust collar 16 attached to the axle 14. Rollers or pulleys 17 and 18, smaller than the wheels 12 and 13, are mounted in the planes of said wheels, respectively, on an axle 19 thereabove, parallel to the axle 14. The pulleys 17 and 18 are independently rotatable on said axle 19 and are held in their respective planes by means of a spacing collar 20. The lower pulley 17 rests upon a thrust collar 21 attached to the axle 19. A belt 22 travels around the wheel 12 and pulley 17, and another belt 23 travels around the wheel 13 and pulley 18. Between the wheel 12 and pulley 17, the belt 22 on one side is held inward off the line of common tangency between the said wheel and pulley by means of an idling roller or pulley 24 on the end of an arm 25 attached to a fixed frame bar 26. Similarly, the belt 23 on the other side is held inward off the line of common tangency between the wheel 13 and pulley 18 by means of an idling roller or pulley 27 on the end of an arm 28 attached to the bar 26.

On the side of the belt 22 opposite the pulley 24 a cooperating assembly, indicated generally at 29, is disposed comprising an upper roller 30 adjacent pulley 17 and in the same plane therewith, and lower roller 31 near the lower end of the wheel 12. These rollers are mounted on the opposite ends of an adjustable pivoted frame piece 32. The manner of pivoting the frame piece is described hereinafter. A belt 33 travels around these rollers and is frictionally engaged with the belt 22. An idling roller 34 engages the inner face of the belt 33 on the outer side above the roller 31 to hold it outward and prevent it contacting its inner side. Another idling roller 35 engages the inner face of the belt 33 on the inner side near the upper end of the wheel 12 to provide a substantial arc of contact between the belts 22 and 33 on the rim of the wheel 12 where pulling of the stalks is effected.

On the side of the belt 23 opposite the pulley 27 a cooperating assembly 36 is disposed, similar to the assembly 29, and it comprises rollers 37, 38, 39, 40, belt 41, and a pivoted frame piece 42, similar to the rollers 30, 31, 34, 35, belt 33, and frame piece 32, respectively.

Rollers 30 and 37 are fixed to shafts 43 and 44, rotatably mounted in suitable bearings 45 and 46. The belts 33 and 41 are operated in opposite directions, as indicated by the directional arrows, by means of sprockets 47 and 48 fixed to the shafts 43 and 44 for rotation therewith. In operation, the belts 33 and 41 drive the belts 22 and 23, due to the frictional engagement, on the wheels 12 and 13 and pulleys 17 and 18. The sprockets 47 and 48 are connected to driving sprockets 49 and 50 by means of sprocket chains 51 and 52. Tension in these sprocket chains is maintained by idler sprockets 53 and 54 rotatably mounted on the end of arms 55 and 56 to engage one side of the sprocket chains 51 and 52 between their supporting sprockets. The arms 55 and 56 are hinged at 57 and 58 to suitable points on the frames 32 and 42 and springs 59 and 60 tensioned between the arms 55 and 56 and suitable points on the said frames force idling sprockets 53 and 54 against the chains 51 and 52.

The driving sprockets 49 and 50 are fixed to the end of shafts 61 and 62 mounted for rotation in bearings 63 and 64. These shafts 61 and 62 are rotated in opposite directions, as indicated by the directional arrows, by a drive shaft 65, through a gearing arrangement of any desired type contained in a gear box 66. The drive shaft 65 is powered by suitable means (not illustrated).

The frame pieces 32 and 42 are provided with outwardly extending lugs or ears 67 and 68 laterally adjustable by means of shims 69 and 70 having bearings 71 and 72 rotatably supported between collars 73 and 74 of stub posts 75 and 76. These posts are normal to the plane of the assemblies 29 and 36 and are secured to, or integral with, the fixed frame of the machine. In this manner adjustments of the belts 33 and 41 to the face of the belts 22 and 23 are permitted and a degree of pivotal movement is provided about the posts 75 and 76.

Integral with the fixed frame 11 beneath the wheels 12 and 13, beams 77, 78, and 79 project forwardly substantially horizontal. The forward end of the middle beam 78 is provided with dividers in the form of guide rods 80 and 81 converging forwardly to a point 81A. The rear end of rod 80 terminates at a point near and in the same plane as the wheel 12, while the rear end of the other rod 81 terminates at a point near and in the same plane as the wheel 13. Cooperating with guide rods 80 and 81 are lateral guide rods 82 and 83 on beams 77 and 79 converging rearwardly to divert a swath of stalks entering between the frame members 77, 78, and 79 and to guide the stalks for delivery between belts 22 and 33 on one side and belts 23 and 41 on the other side. Stalks entering between any of these cooperating sets of belts are gripped tightly therebetween against the periphery of the wheel 12 or 13 as the case may be. Should any foreign bulky material be carried or drawn between the cooperating sets of belts, the assembly 29 or 36 as the case may be would pivot about its post 75 or 76 and relieve the pressure to prevent any damage to the belts. This pivotal movement does not affect the driving of the belts since a uniform tension is maintained on the sprocket chains 51 and 52 by the idling sprockets 53 and 54. As the stalks are moved rearward, they are also elevated due to the inclination of the belts, which action tends to pull them out of the ground by the roots. The uprooted stalks continue to move forward between the gripping belts until they reach the upper end where the belts separate. At this point the uprooted stalks in a vertical position are fed into the mouth 84 of a vertical binder 85, shown fragmentarily.

The machine is conveniently supported on wheels 86 so that it can be driven through the field to be harvested by tractor or animal.

Having thus described our invention, we claim:

1. A machine for uprooting standing flax and other like plants comprising a pair of wheels concentrically mounted for independent rotation in parallel inclined planes, a pulley mounted in each plane above the wheel therein, belts each supported on and frictionally engaging the peripheries of one of said wheels and its corresponding pulley, an assembly adjacent one side of one belt and another assembly adjacent the other side of the other belt, said assemblies having each a belt frictionally engaging its corresponding adjacent wheel and pulley belt, rollers supporting said assembly belts, means for operating said assembly belts over their respective supporting rollers to move the portions adjacent the wheel and pulley belts upward in said planes thereby also moving the sides of the wheel and pulley belts engaged therewith in the same direction, whereby stalks between said wheel and pulley belts and said assembly belts will be gripped thereby and carried upward.

2. A machine for uprooting standing flax and other like plants comprising a pair of wheels concentrically mounted for independent rotation in parallel inclined planes, a pulley mounted in each plane above the wheel therein, belts each supported on and frictionally engaging the peripheries of one of said wheels and its corresponding pulley, an assembly adjacent one side of one belt and another assembly adjacent the other side of the other belt, said assemblies having each a belt frictionally engaging its corresponding adjacent wheel and pulley belt, rollers supporting said assembly belts, means for operating said assembly belts over their respective supporting rollers to move the portions adjacent the wheel and pulley belts upward in said planes thereby also moving the sides of the wheel and pulley belts engaged therewith in the same direction, whereby stalks between said wheel and pulley belts and said assembly belts will be gripped thereby and carried upward, idling rollers between each wheel and pulley for holding the belt thereof inward off the line of common tangency on the side opposite its cooperating assembly.

3. A machine for uprooting standing flax and other like plants comprising a pair of wheels concentrically mounted for independent rotation in parallel inclined planes, a pulley mounted in each plane above the wheel therein, belts each supported on and frictionally engaging the peripheries of one of said wheels and its corresponding pulley, an assembly adjacent one side of one belt and another assembly adjacent the other side of the other belt, said assemblies having each a belt frictionally engaging its corresponding adjacent wheel and pulley belt, rollers supporting said assembly belts, means for operating said assembly belts over their respective supporting rollers to move the portions adjacent the wheel and pulley belts upward in said planes thereby also moving the sides of the wheel and pulley belts engaged therewith in the same direction, whereby stalks between said wheel and pulley belts and said assembly belts will be gripped thereby and carried upward, and guide means for leading standing stalks to the points between said wheel and pulley belts and their cooperating assembly belts.

4. A machine for uprooting standing flax and other like plants comprising a pair of wheels concentrically mounted for independent rotation in parallel inclined planes, a pulley mounted in each plane above the wheel therein, belts each supported on and frictionally engaging the peripheries of one of said wheels and its corresponding pulley, an assembly adjacent one side of one belt and another assembly adjacent the other side of the other belt, said assemblies having each a belt frictionally engaging its corresponding adjacent wheel and pulley belt, rollers supporting said assembly belts, means for operating said assembly belts over their respective supporting rollers to move the portions adjacent the wheel and pulley belts upward in said planes thereby also moving the sides of the wheel and pulley belts engaged therewith in the same direction, whereby stalks between said wheel and pulley belts and said assembly belts will be gripped thereby and carried upward, and guide means for dividing a swath of standing stalks and leading one part of the swath to the point between one wheel and pulley belt and its cooperating assembly belt and the other part to the point between the other wheel and pulley belt and its cooperating assembly belt.

5. In a machine for uprooting standing flax and other like plants, a fixed frame structure, a wheel rotatably mounted on said structure in an inclined plane, a roller mounted in the same plane above the wheel, a belt supported on and frictionally engaging the peripheries of said wheel and roller; an assembly adjacent one side of said belt, said assembly being pivoted to said frame structure, said assembly having also a belt engaged with the first-mentioned belt, rollers supporting said assembly belt, means for operating said assembly belt over its supporting rollers to move a portion adjacent said first-mentioned belt upward along the incline and to induce the side of the other belt engaged therewith to move in the same direction, whereby stalks between said belts will be gripped thereby and carried upward.

WILBUR MAGRUDER HURST.
LEONARD M. KLEIN.